United States Patent Office 3,658,963
Patented Apr. 25, 1972

3,658,963
METHOD OF REDUCING INTRAOCULAR PRESSURE WITH A BASIC THYMOL ETHER
Paul Turner, London, Vincent James Marmion and John Mason Sneddon, Bristol, and David D. H. Craig, Eastleigh, England, assignors to Warner-Lambert Company, Morris Plains, N.J.
No Drawing. Filed July 7, 1970, Ser. No. 52,987
Int. Cl. A61k 27/00
U.S. Cl. 424—311     3 Claims

ABSTRACT OF THE DISCLOSURE

Water-soluble salts of basic thymol ethers having the general formula

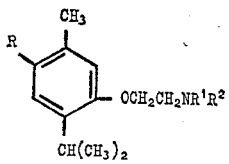

in which R is an hydroxyl, alkoxy or acyloxy group and $R^1$ and $R^2$ are lower alkyl groups, are used in aqueous solution at pH 3.5 to 9.0 to lower intraocular pressure. The salts may be formulated in compositions together with a pH-adjusting agent and preferably a bactericide or fungicide.

---

The invention relates to ophthalmic compositions.

It is known that glaucoma can be recognised by an increase in intraocular pressure. The conditions giving rise to glaucoma are not well understood, but it is believed by some to be due to an increase in the resistance to the outward flow of aqueous humour from the eyeball at the point at which the Canal of Schlemm drains the eye. Attempts to correct or reduce such increase have had but limited success. The best known substance which has been used for this purpose is the alkaloid pilocarpine. The action of pilocarpine is not understood.

Other substances which have been used in the treatment of glaucoma include adrenaline and noradrenaline which reduce intraocular pressure in about two-thirds of the patients treated. Use is limited to simple open angle glaucoma and is contraindicated in the case of closed angle glaucoma. N-(2-chloroethyl)benzylamine has been used experimentally in very dilute solution as a slow intravenous drip both for treating simple glaucoma and acute glaucoma. It is an irritant compound and great care is necessary in its use. 2-(1'-azacyclooctyl)ethylguanidine which is mainly used for the control of hypertension has also been shown to be of use in the treatment of glaucoma: this has been shown to be due to its combined action in decreasing the rate of production of aqueous humour and in increasing the facility of outflow from affected eyes.

It has now been found that relief can be secured in cases of glaucoma by the administration of aqueous solutions of certain basic thymol ethers.

Accordingly the present invention provides a sterile ophthalmic composition comprising (a) a water-soluble salt of a basic thymol ether having the general formula

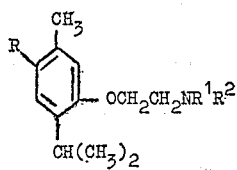

in which R, is an hydroxy, alkoxy or acyloxy group, said alkoxy or acyloxy group having not more than 4 carbon atoms and $R^1$ and $R^2$ are alkyl groups having 1 to 4 carbon atoms, and (b) a pharmacologically acceptable pH adjusting agent or agents present in such proportions as to produce a pH in aqueous solution within the range of 3.5 to 9.0. If the composition comprises more than one dose it also preferably comprises a water-soluble bactericide and/or fungicide.

Preferably the pharmacologically acceptable pH adjusting agent or agents are present in such proportions as to produce in aqueous solution a pH within the range of 5.0 to 8.0; most preferably the adjusting agent or agents should produce a solution of pH 5.5–6.0.

The ophthalmic compositions of the present invention may either be in the form of solid mixtures of the stated ingredients or in the form of aqueous solutions. Such aqueous solutions may either be concentrated solutions which require dilution prior to use or may be solutions of the correct concentration for use as eye drops. The solid mixtures may be obtained by freeze concentration and ultimate freeze drying of concentrated solutions of the components. The solid mixture may also be prepared by intimately admixing a water-soluble salt of a basic thymol ether having the above general formula, such as the hydrochloride or sulphate thereof, with the pH adjusting agent or agents. Such solid mixtures are preferably sterilised when placed within a container or after sealing in a container.

The pH adjusting agent may result in a composition which when dissolved in water at the proper concentration for use results in a solution which is substantially isotonic with lachrymal secretions. If such solution is not substantially isotonic an additional constituent of the mixture may be a salt, such as sodium chloride, which will result in substantial isotonicity with lachrymal secretions.

The basic thymol ethers used in accordance with the present invention may be obtained following the general directions given in British patent specification No. 745,070 by reacting 4-acetamidothymol with a dialkylaminoethyl halide having the general formula $R^1R^2NCH_2CH_2X$ in which $R^1$ and $R^2$ are as above defined and X is a chlorine or bromine atom, so as to form the corresponding dialkylaminoethyl ether, followed by hydrolysing the acetamido group with hydrochloric acid so as to form the corresponding dialkylaminoethyl ether of 4-aminothymol. After basification and isolation of the latter ether, it is diazotised and the diazo compound boiled in the presence of copper sulphate until evolution of nitrogen ceases. The reaction mixture is then made alkaline and carbon dioxide passed in order to liberate the dialkylaminoethyl ether of 4-hydroxythymol. The 4-hydroxythymol ether may then be treated with halide or anhydride of an alkanoic acid having up to 4 carbon atoms in order to produce the corresponding 4-acyloxythymol ether or, alternatively, it can be treated with an etherifying agent, such as a diazoalkane having up to 4 carbon atoms, in order to produce the corresponding 4-alkoxythymol ether. Since the ethers contain a tertiary amino group they are normally isolated and purified in the form of their salts with water-soluble acids, such as the hydrochloride or sulphate.

It is preferred to use those thymol ethers in which the group R is an acetoxy or methoxy group. Also preferred are those ethers in which $R^1$ and $R^2$ are methyl or ethyl groups.

The water-soluble bactericide and fungicide which is preferably present may be a water-soluble salt of an organo-mercury compound, for example, a salt of an aryl mercury hydroxide, such as phenyl mercury nitrate or acetate, or it may be a water-soluble salt of a bactericidal and fungicidal organic base, such as a water-soluble salt of 1,6-bis(para chlorophenylbiguanido)-hexane, e.g. the acetate thereof.

The substance or substances which may be used to adjust the pH of the thymol ether solution to within the range 3.5 to 9.0 may be a substance which simultaneously produces an isotonic or substantially isotonic solution when dissolved in water at the proper concentration for use or it may be a mixture of two or more ingredients which together act as a chemical buffer which gives a pH of from 3.5 to 9.0 and which may or may not produce such an isotonic solution when present at the proper concentration. The constituents of the buffer ingredients may be (a) an organic or inorganic acid and a salt of an organic acid, e.g., boric acid and sodium acetate or acetic acid and sodium acetate, (b) an ammonium base and a salt of such a base, e.g., a mixture of ammonium hydroxide and ammonium chloride, (c) a mixture of an acid salt of a polybasic acid and a substantially neutral salt of the same or another polybasic acid, e.g., a mixture of monosodium dihydrogen and disodium monohydrogen phosphates or a mixture of potassium hydrogen phthalate and disodium monohydrogen phosphate, or (d) a protein buffer system, such as a gelatine or peptone based buffer. It will be appreciated that only certain of the above buffers are suitable for inclusion in solid state mixtures.

When a solution isotonic with lachrymal secretions is required the inclusion of an appropriate proportion of sodium chloride or other suitable salt in the mixture will secure this, but the pH should be within the range 3.5 to 9.0. Sodium chloride may be included in a solid mixture which, when dissolved in water, will yield such a solution.

The sterileophthalmic solutions of the invention may be made as masterbatches for subsequent dilution or may be made to the ultimate concentration required for physiological solutions. Thus, the solutions may have the water-soluble salt of the basic thymol ether present in proportions of 0.005%–10% by weight. All such solutions should be prepared under aseptic conditions using purified or sterile water and sterilised by an appropriate method, e.g., by filtration and filled under aseptic conditions. All ingredients should comply with the standards required by the British Pharmacopoeia or the British Pharmaceutical Codex where these exist.

The compositions of the invention are of greater stability in the solid state and if storage for a substantial period is envisaged it is preferred to supply in the solid sterile state in sealed containers. Aqueous solutions may be prepared therefrom as required by adding the sterile solid composition to sterile or purified water or vice versa. Solid sterile compositions are preferably produced by intimately admixing the solid ingredients in predetermined proportions, placing a predetermined proportion of the mixture in a sterile container, treating with ethylene oxide and then sealing the container. Alternatively the mixture may be placed within a sterile container, the container sealed and the sealed container and its contents then submitted to sufficient radiation to ensure sterilisation.

It has already been indicated that the compositions of the invention are useful for the treatment of glaucoma. To demonstrate the results obtainable tests have been carried out using subjects having healthy eyes and subjects diagnosed to be suffering from chronic simple glaucoma. The subjects having healthy eyes were divided into groups in order to secure an even distribution of eye colouring (brown and blue) and of males and females.

In all cases the intraocular pressure of both eyes was measured using a Goldmann Applanation Tonometer. This is an instrument which enables the amount of flattening of the surface of the eye by the application thereto of a given force to be determined. Alternatively it can be used to determine the force required to flatten a given area of the surface of the eye. From the results obtained the intraocular pressure can be readily calculated. The average daytime intraocular pressure of humans has been shown to be 15.1 mm. of mercury: when this figure exceeds 21 mm. the case is considered to need investigation. In carrying out the tests one drop of a 0.5% solution of 4-acetoxythymoxy ethyl dimethylamine hydrochloride solution buffered to pH 5.5 with a borate buffer and containing an antimicrobial agent was instilled in one eye whilst the other eye remained untreated and served as a control. The intraocular pressure was determined 60 minutes later.

A decrease in the intraocular pressure of those subjects having healthy eyes was found and on subjecting the changes recorded to statistical analysis following the Student 't' test (see "Principles of Medical Statistics," Bardford Hill, page 146) it was shown that a statistically significant decrease in intraocular pressure existed, $t=4.82$, $p=0.001$.

In the case of the subjects suffering from chronic simple glaucoma six patients each having intraocular pressures in both eyes greater than 35 mm. of mercury as determined by a Goldmann Applanation Tonometer were taken. One drop of the same 0.5% solution of 4-acetoxythymoxyethyl dimethylamine hydrochloride as used in the test described above was instilled into one eye of each sufferer and the intraocular pressure of both eyes was measured 60 minutes after such introduction. The changes in intraocular pressure were subjected to statistical analysis and it was determined that a statistically significant decrease in intraocular pressure occurred for which $t=8.34$ and $p>0.001$.

In addition it was found that the power of accommodation of the treated eyes was not disrupted. This is in marked contrast to the standard treatment with pilocarpine which disrupts the power of accommodation of the eye.

The following examples illustrate the invention.

EXAMPLE 1

An intimate mixture is made of the following:

| | Parts by weight |
|---|---|
| 4-acetoxythymoxyethyl dimethylamine hydrochloride | 565 |
| Boric acid crystals | 1610 |
| Sodium acetate | 90 |
| Phenyl mercuric nitrate | 2 |

When dissolved in sufficient water to make 100,000 parts by weight, this gives a 0.5% aqueous solution of the amine having a pH of 6.

EXAMPLE 2

An intimate mixture is made of the following:

| | Parts by weight |
|---|---|
| 4 - acetoxythymoxyethyl dimethylamine hydrochloride | 565 |
| Potassium dihydrogen phosphate | 363 |
| Disodium hydrogen phosphate (anhydrous) | 568 |
| Phenyl mercuric nitrate | 2 |

When dissolved in sufficient water to make 100,000 parts by weight, this gives a 0.5% aqueous solution of the amine having a pH of 7.0.

EXAMPLE 3

The following are dissolved in purified water:

| | Parts by weight |
|---|---|
| 4-acetoxythymoxyethyl dimethylamine hydrochloride | 113 |
| Sodium acetate | 1360 |
| Glacial acetic acid | 300 |
| Chlorhexidine acetate | 10 | and the solution made up to 100,000 parts by weight by the addition of further purified water. The pH of the solution is 4.5.

EXAMPLE 4

A solution substantially isotonic with lachrymal solution is made up in purified water as follows:

| | Parts by weight |
|---|---|
| 4 - acetoxythymoxyethyl dimethylamine hydrochloride | 500 |
| Sodium chloride | 800 |
| Phenylmercuric nitrate | 2 |

The solution is then made up with purified water to 100,000 parts by weight. The pH of the solution is 5.5.

EXAMPLE 5

A solution substantially isotonic with lachrymal solution is made up in purified water as follows:

| | Parts by weight |
|---|---|
| 4 - acetoxythymoxyethyl dimethylamine hydrochloride | 500 |
| Boric acid | 190 |

The resulting solution is then made up to 100,000 parts by weight with purified water. The pH of the solution is 5.3.

When aqueous solutions are made up as described in the examples and instilled into human eyes the solutions have been found to bring about a decrease in intraocular pressure as determined by a Goldmann Applanation Tonometer.

We claim:

1. The method of reducing intraocular pressure in the human eye which comprises instilling into an eye of a subject having raised intraocular pressure of an effective intraocular pressure reducing amount of an aqueous solution having a pH of about from 3.5 to 9.0 and 0.005% to 10% by weight of a water-soluble salt of a basic thymol ether having the formula

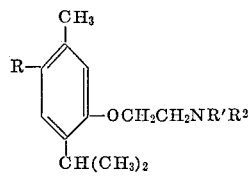

in which R is a member selected from the group consisting of hydroxy, alkoxy having 1 to 4 carbon atoms and acyloxy having 1 to 4 carbon atoms and $R^1$ and $R^2$ are alkyl groups having 1 to 4 carbon atoms.

2. A method as defined in claim 1 wherein said water-soluble salt of a basic thymol ether is 4-acetoxythymoxyethyl dimethylamine hydrochloride.

3. A method according to claim 2 wherein said 4-acetoxythymoxyethyl dimethylamine hydrochloride is present at a concentration of 0.5%.

References Cited

FOREIGN PATENTS 745,070    2/1956    Great Britain    424—330

OTHER REFERENCES

Remington's Practice of Pharmacy, 1961, pp. 358–366.

ALBERT T. MEYERS, Primary Examiner

N. A. DREZIN, Assistant Examiner

U.S. Cl. X.R.

424—330